INVENTORS.
GERARD J. DEINZER
EDWARD C. NUPNAU
BY Kegan, Kegan & Berkman
ATTYS.

INVENTORS
GERARD J. DEINZER
EDWARD C. NUPNAU
BY Kegan, Kegan & Berkman
ATTYS.

United States Patent Office 3,535,464
Patented Oct. 20, 1970

3,535,464

APPARATUS FOR REMOTELY STORING NOTES AND MESSAGES FOR LATER RETRIEVAL

Gerard J. Deinzer, Chicago, and Edward C. Nupnau, South Beloit, Ill., assignors to Private Tele-Communications, Inc., Chicago, Ill., a corporation of Illinois
Filed Jan. 29, 1969, Ser. No. 794,850
Int. Cl. G11b *19/02, 31/00;* H04m *11/10*
U.S. Cl. 179—100.1 3 Claims

ABSTRACT OF THE DISCLOSURE

A verbal message or memo storing and retrieval apparatus for connection to an inter-communication system. Said apparatus adapted to be rendered operative from any of a plurality of stations in said system. Said apparatus comprising a voice recorder; a centrally located fast attack, slow release voice operated switch for activating and deactivating said recorder; a unijunction transistor tone signal generator for indicating to the person originating a message that the recorder is in a record mode; an indicator light responsive to the activation of said recorder, but being immune to spurious impulses in said inter-communication system, and playback means capable of being operated simultaneously and independently of said recorder.

This invention relates to storage of verbal information at a central location remote from the point of origin. More specifically this invention relates to means for storing spoken messages and notes from any of a plurality of remote points of a private communications system within a plant or building.

Although recording devices and dictating machines are well known in the prior art, thus far no such apparatus has been completely satisfactory for recording short messages or notes which originate at remote telephone or intercom stations within a communications system. Prior art recording and dictating devices have been unsuitable for expedient connection to pre-existing communications systems. Some have required manual operation at the recording point, or additional communication channels for control purposes. Others, while automatic in operation, have been unduly sensitive to spurious signals present in the communications system. Still other devices have inefficiently utilized large quantities of magnetic tape, or have been unavailable for storing messages due to being left unattended while recorded to full capacity for long periods of time.

It is an object of this invention to provide a system whereby messages are stored for persons who cannot be immediately reached by telephone or intercom or for persons who should have a typed message. It is a further object of this invention to provide a system whereby notes and memos can be stored efficiently for later typing at a central location.

A feature of this invention is a voice operated relay for starting and stopping recordation of information to provide efficient utilization of the recording media.

Another feature of this invention is a clear channel tone signal generator for indicating to the message originator that the device is in condition to accept a message.

Yet another feature of the invention is a signal light circuit for alerting the typist that a message is stored and is ready for typing. Said signal light circuit is immune to actuation by spurious impulses which may be present in a telephone system.

A further feature of this invention is an ability to record a message while simultaneously delivering a message for typing.

The memory unit may be readily installed and used with pre-existing private telephone systems and intercom systems, and may also be used to record messages and notes from telephones outside the system.

Further objects and advantages of this invention will become evident from the following description, which, taken in connection with the accompanying drawings, discloses a preferred embodiment of the invention.

Figure 1:
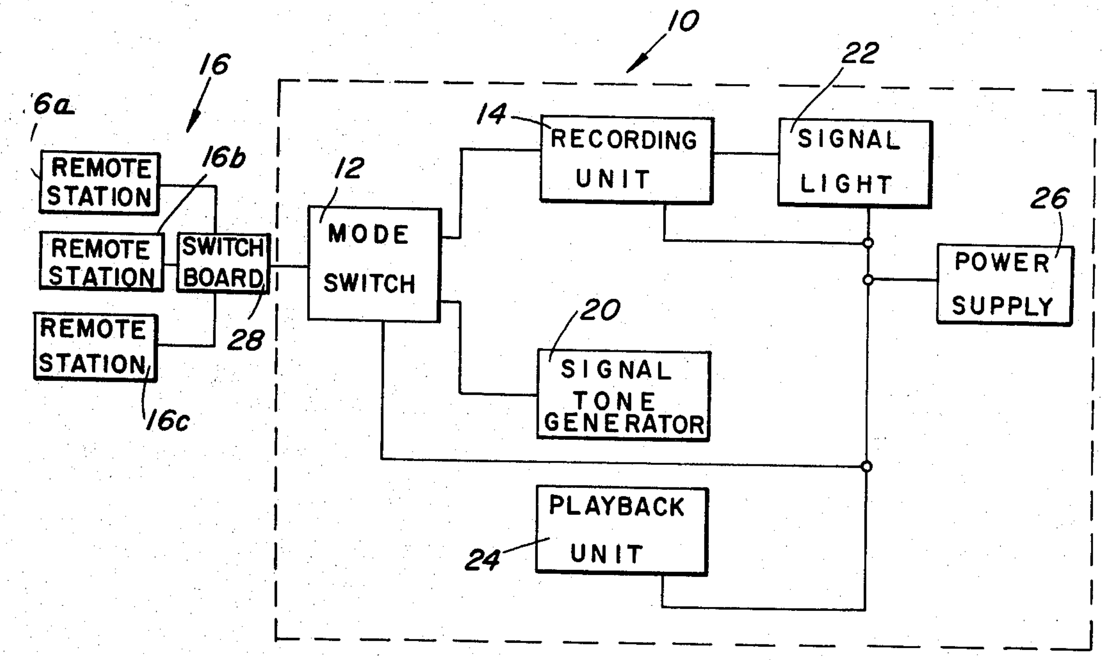
FIG. 1 is a block diagram showing an embodiment of the invention as it is used in conjunction with an intercom or telephone system.

Referring in detail to FIG. 1 there is shown a block diagram of the apparatus embodying the invention. A mode switch 12 connects a centrally located recording unit 14 to an intercom or private telephone system 16 consisting of a plurality of remote transmitting and receiving stations 16*a*, 16*b* and 16*c*. Any station of the communications system can be connected to the memory unit by means of the communications system switchboard 28 which does not constitute a part of this invention. Upon connection to the memory unit, a distinctive signal tone generated by a signal tone generator 20, shown in detail in FIG. 3, is sent through the mode switch 12 and through the communications system 16 to a remote station 16*a*. This signal tone indicates to the person using the remote station 16*a* that the recording unit 14 is prepared to receive a message. As is explained in detail below, the mode switch 12 may be a relay operated by a switch at the remote station 16*a*, or it may be a voice operated switch as shown schematically in FIG. 2. The mode switch 12 disconnects the signal tone generator from the communication system and activates the motor of the recording unit 14, which is a magnetic tape cartridge recorder of a type well known in the art. The person at the remote station dictates his message which is recorded in the recording unit 14. Upon the activation of the recording unit 14, a signal light 22 is turned on to indicate to the typist that a message is being recorded. The circuitry of the signal light 22 is shown in detail in FIG. 4 and described below. After the message is recorded, the typist removes the tape cartridge from the recording unit 14 and inserts it into the playback unit 24 which is capable of being operated independently of the other components of the system. A second tape cartridge may be inserted in the recording unit to receive messages from remote stations 16 while the message on first tape cartridge is being typed.

The apparatus 10 consisting of a mode switch 12, recording unit 14, signal tone generator 20, signal light 22 and playback unit 24 may be powered by a common power supply 26 as shown in FIG. 1, or the various components may be powered by separate power supplies.

The mode switch 12 may consist of a relay operated by switches at each of the remote stations 16*a*, 16*b* and 16*c*. Using such a manually operated system a person wishing to dictate a message dials or otherwise has his remote station 16*a* connected through the switchboard 28 to the message unit 10. Upon the making of this connection, if the recording unit 14 is not already in use, the tone produced by the signal tone generator 20 will be sent through the mode switch 12 over the communications system 16. When the signal tone is heard by the person dictating, he turns on the recording unit 14 by actuating the mode switch 12. The mode switch 12 is either a relay controlled by a hand switch at the remote station, or it may be a voice operated switch, as shown in FIG. 2, being responsive to the speaker's voice to turn on the recording unit.

Figure 2:
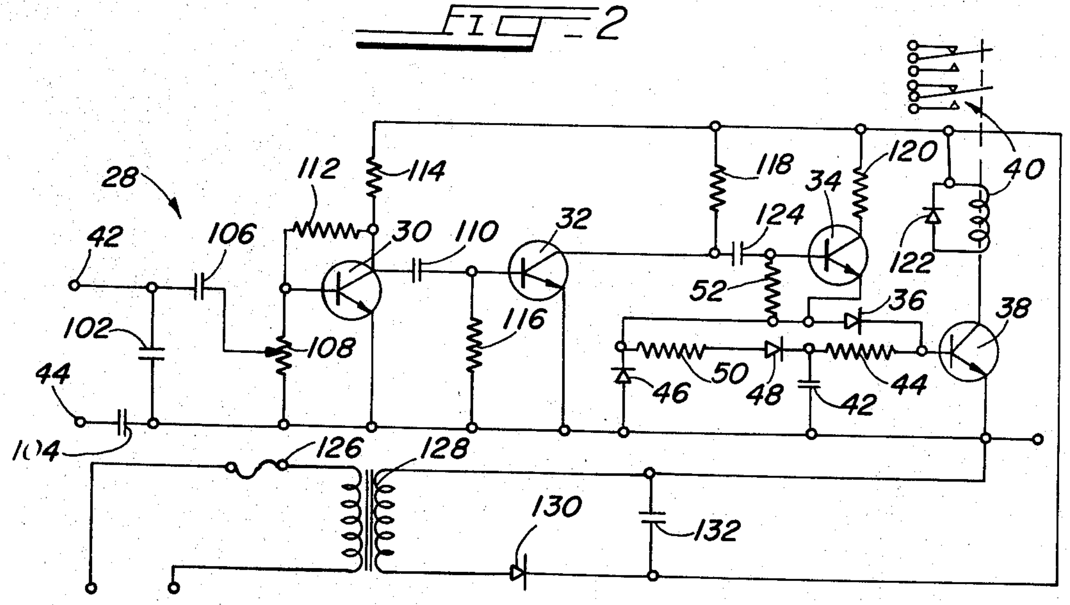
FIG. 2 is a schematic diagram of the voice operated switch of the invention.
Figure 3:
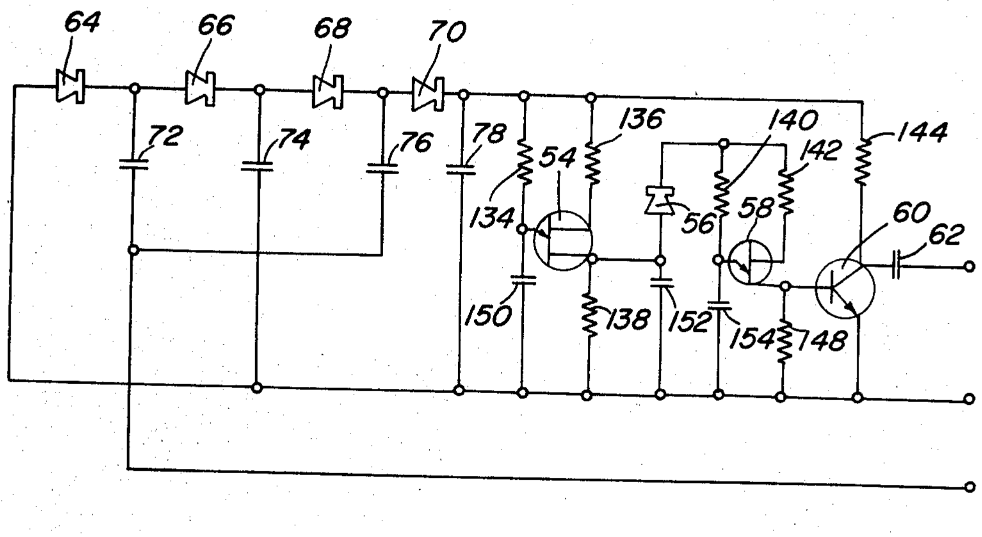
FIG. 3 is a schematic diagram of the tone signal generator of the invention.

Referring more particularly to FIG. 2, there is shown a schematic diagram of the voice operated switch comprising an audio amplifier consisting of transistors 30 and 32 driving an audio amplifier consisting of transistor 34. The output of transistor 34 is coupled by means of a diode 36 to the base of transistor 38 which is a switch in series with a relay coil 40. The operation of this voice operated switch 30 is characterized by a fast "on" time and a slow "off" time to prevent stoppage of the recording unit 14 between syllables and words. This is accomplished as follows: The audio signal of a speaker's voice is fed from the intercommunication system to terminals 42 and 44. When the person dictating stops speaking, capacitor 42 discharges through resistor 44 to keep the transistor 38 conductive between syllables and words. The voice operated relay shown in FIG. 2 has an "attack" or on time of approximately 450 milliseconds and a "release" or off time of 2 to 4 seconds. Diodes 46 and 48 provide negative bias to the transistors 34 and 38, holding them in an "off" or non-conductive state in the absence of an audio signal. Resistors 50 and 52 serve to reduce the negative bias to a suitable value.

FIG. 3 shows schematically the signal tone generator in which a unijunction transistor 54 oscillates at a relatively slow rate of about 1 cycle per second providing, through diode 56, an interrupted direct current for powering unijunction transistor 58 which oscillates at an audible frequency. Transistor 60 amplifies the resulting tone which is sent through the intercommunication system via capacitor 62. Direct current is supplied to the tone generator by means of rectifier diodes 64, 66, 68 and 70, and is filtered by capacitors 72, 74, 76 and 78.

Figure 4:
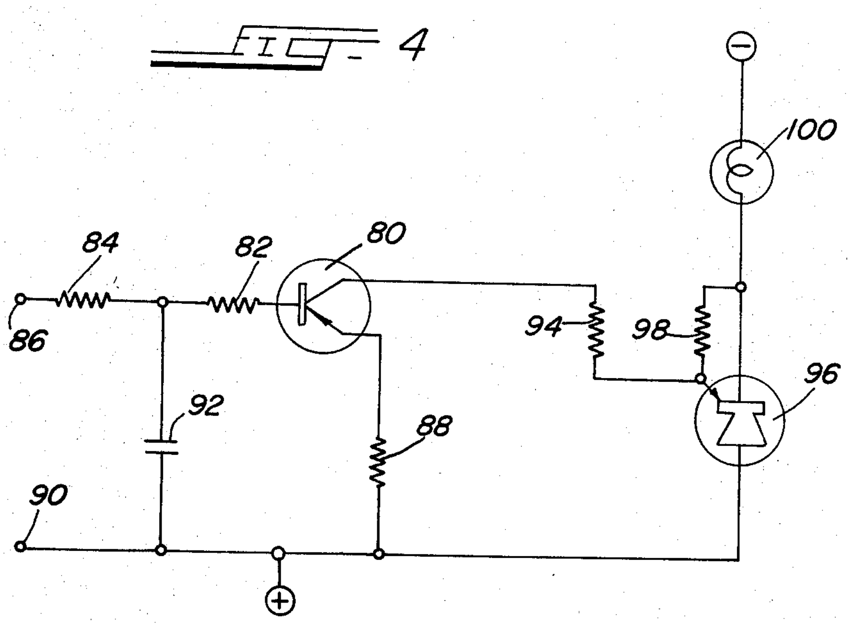
FIG. 4 is a schematic diagram of a signal light circuit of the invention, which circuit is not subject to actuation by spurious impulses.

FIG. 4 shows schematically the signal light circuit of the invention. The base of transistor 80 is connected through resistors 82 and 84 to terminal 86. The emitter of transistor 80 is connected through resistor 88 to terminal 90 which is positively biased. Terminals 86 and 90 are connected across the motor of the recording unit 14 shown by block diagram of FIG. 1. When the motor of the recording unit 14 is energized, current flows through resistor 84 and charges capacitor 92. Once capacitor 92 is charged, current flows through resistor 82 to the base of transistor 80, rendering the emitter-collector circuit of transistor 80 conductive. Current from the collector of transistor 80 is applied through resistor 94 to the control element of silicon controlled rectifier 96 which is normally biased non-conductive by resistor 98. The collector current of transistor 80 triggers the silicon controlled rectifier 96 into a conductive state, actuating the signal light 100. Resistor 84 and capacitor 92 form a filter network which prevents spurious impulses present in the communications system from rendering transistor 80 conductive, thereby triggering silicon controlled rectifier 96 to light the signal light 100. The signal light 100 will therefore be actuated only by sustained current applied through terminals 86 and 90, and will not give false signals due to short duration impulses.

In the preferred embodiments of the circuits disclosed herein, the component types and values are as follows:

| | |
|---|---|
| FIG. 2: | |
| 30 | 4001. |
| 32 | 4001. |
| 34 | 4001. |
| 38 | 6001. |
| 40 | 24 v. D.C., 500 ohms relay. |
| 42 | 1000 mfd. |
| 44 | 1K ohm. |
| 46 | 1N34A. |
| 48 | 1N34A. |
| 50 | 220 ohms. |
| 102 | .15 mfd. |
| 104 | .15 mfd. |
| 106 | .15 mfd. |
| 108 | 10K ohms. |
| 110 | 1 mfd. |
| 112 | 470K ohms. |
| 114 | 33K ohms. |
| 116 | 10K ohms. |
| 118 | 33K ohms. |
| 120 | 22K ohms. |
| 122 | 1N34A. |
| 124 | 1 mfd. |
| 126 | 1 amp. |
| 128 | T 215. |
| 130 | Silicon diode. |
| 132 | 250 mfd. |
| FIG. 3: | |
| 54 | 2N2160. |
| 56 | 10B1. |
| 58 | 2N2160. |
| 60 | 6001. |
| 62 | .047 mfd. |
| 64 | 10B1. |
| 68 | 10B1. |
| 70 | 10B1. |
| 72 | 250 mfd. |
| 74 | 250 mfd. |
| 76 | 250 mfd. |
| 78 | 250 mfd. |
| 134 | 10K ohms. |
| 136 | 1K ohm. |
| 138 | 680 ohms. |
| 140 | 47K ohms. |
| 142 | 10K ohms. |
| 144 | 1K ohms. |
| 148 | 100 ohms. |
| 150 | 100 mfd. |
| 152 | 1 mfd. |
| 154 | 0.1 mfd. |
| FIG. 4: | |
| 80 | 2N406. |
| 82 | 10K ohms. |
| 84 | 33K ohms. |
| 88 | 470 ohms. |
| 92 | 25 mfd. |
| 94 | 470 ohms. |
| 96 | C106F2. |
| 98 | 220 ohms. |
| 100 | No. 328. |

While a preferred embodiment of the invention has been described, various changes may be made without departing from the spirit and the underlying principles of the invention. It is, therefore, desired by the following claims to include in the scope of the invention all such variations and modifications by which substantially the results of the invention may be obtained through the use of substantially the same or equivalent means.

What is claimed is:

1. In a communications system including a plurality of transmitting and receiving stations and means for interconnecting a selectable transmitting station with a selectable receiving station, the improvement comprising:

centrally located voice recording means; switch means for activating and deactivating said recording means from any said transmitting station;

signal means for indicating at said transmitting station that said recording means is receptive to record a message;

indicator means responsive to the recordation of information for indicating that a message is recorded;

independently operable voice playback means;

said switch means being a voice operated switch having an electromagnetic relay, a switching transistor for actuating said relay, said switching transistor having an emitter, a base and a collector, an audio amplifying transistor having an emitter, a base and a collector, a source of direct current for biasing said transistors and operating said relay, a source of audio signals applied to the base of said audio amplifying transistor, a first diode connecting the emitter of said audio amplifying transistor to the base of said switching transistor whereby audio current flowing through the first diode renders said switching transistor conductive, a second diode connected between ground and the emitter of said audio amplifying transistor, and a resistor and a capacitor connected in series between the emitter of said switching transistor and ground, said resistor and capacitor forming a network for biasing the base of said switching transistor to hold said switching transistor conductive between syllables and words of said audio signal.

2. In a communications system including a plurality of transmitting and receiving stations and means for interconnecting a selectable transmitting station with a selectable receiving station, the improvement comprising:

centrally located voice recording means; switch means for activating and deactivating said recording means from any said transmitting station;

signal means for indicating at said transmitting station that said recording means is receptive to record a message;

indicator means responsive to the recordation of information for indicating that a message is recorded;

independently operable voice playback means;

said signal means being a signal tone generator having a source of direct current, first oscillator means for producing a sub-audio frequency alternating current from said source of direct current, diode means for rectifying said sub-audio frequency alternating current to provide a source of interrupted direct current, second oscillator means for producing an audio frequency alternating current, said second oscillator means being powered by said source of interrupted direct current to produce an interrupted audio frequency electrical signal, amplifier means for increasing the amplitude of said interrupted audio frequency signal, and terminal means for coupling said interrupted audio frequency electrical signal to a communications system.

3. The apparatus set forth in claim 2 wherein said first and second oscillator means are unijunction transistor oscillators, and wherein said amplifier means is a transistor amplifier.

References Cited

UNITED STATES PATENTS

| | | | |
|---|---|---|---|
| 3,222,460 | 12/1965 | Albanes | 179—100.1 |
| 3,132,213 | 5/1964 | Taylor | 179—100.1 |

OTHER REFERENCES

Cleary, J. F.: "G.E. Transistor Manual," sixth edition, 1962, General Electric Co., pp. 359 and 378.

JAMES W. MOFFITT, Primary Examiner

J. ROSENBLATT, Assistant Examiner

U.S. Cl. X.R.

179—6; 331—108